(12) United States Patent  
Welch

(10) Patent No.: US 10,348,437 B2  
(45) Date of Patent: Jul. 9, 2019

(54) METHOD AND SYSTEM FOR CASSETTE BASED WAVELENGTH DIVISION MULTIPLEXING

(71) Applicant: Luxtera, Inc., Carlsbad, CA (US)

(72) Inventor: Brian Welch, San Diego, CA (US)

(73) Assignee: Luxtera, Inc., Carlsbad, CA (US)

(*) Notice: Subject to any disclaimer, the term of this patent is extended or adjusted under 35 U.S.C. 154(b) by 0 days.

(21) Appl. No.: 15/585,838

(22) Filed: May 3, 2017

(65) Prior Publication Data

US 2017/0237516 A1 Aug. 17, 2017

Related U.S. Application Data

(63) Continuation-in-part of application No. 15/356,514, filed on Nov. 18, 2016, now abandoned.

(Continued)

(51) Int. Cl.
*H04J 14/02* (2006.01)
*H04B 10/25* (2013.01)

(Continued)

(52) U.S. Cl.
CPC .......... *H04J 14/02* (2013.01); *G02B 6/12007* (2013.01); *G02B 6/428* (2013.01);

(Continued)

(58) Field of Classification Search
CPC .. H04J 14/02; H04J 14/0278; G02B 6/12007; G02B 6/4215; G02B 6/428; G02B 6/30; G02B 6/34; G02B 6/4249; G02B 6/4292; G02B 6/4246; G02B 6/2938; H04B 10/2504; H04B 10/40; H04B 10/503; H04B 10/516; H04B 10/70; H04B 10/502; H04B 10/5053; H04B 10/505; H04B 2210/078; H04Q 2011/0016; H04Q 2011/0015

(Continued)

(56) References Cited

U.S. PATENT DOCUMENTS 5,754,321 A * 5/1998 Giles ...................... G02B 6/272  
 398/83  
6,718,140 B1 * 4/2004 Kamei ................ H04J 14/0227  
 398/68

(Continued)

*Primary Examiner* — Hibret A Woldekidan  
(74) *Attorney, Agent, or Firm* — McAndrews, Held & Malloy

(57) ABSTRACT

A method and system is provided for cassette based wavelength division multiplexing and may include an optical system with an aggregating cassette. The optical system may include optical transceivers, with each generating optical signals at a different wavelength. The aggregating cassette may include one or more multiplexers coupled to each of the optical transceivers via optical fibers. The optical transceivers may generate modulated optical signals at one of the different wavelengths. The optical fibers may communicate one of the modulated optical signals from each of the optical transceivers to the one or more multiplexers. The modulated optical signals may be multiplexed to one or more output optical fibers. The multiplexed signals may be communicated to one or more receiving demultiplexers using the one or more output optical fibers. The one or more demultiplexers may demultiplex said multiplexed signals into separate wavelength signals.

20 Claims, 9 Drawing Sheets

Related U.S. Application Data

(60) Provisional application No. 62/386,158, filed on Nov. 18, 2015.

(51) Int. Cl.
| | | |
|---|---|---|
| *H04B 10/40* | (2013.01) | |
| *H04B 10/50* | (2013.01) | |
| *H04B 10/516* | (2013.01) | |
| *G02B 6/42* | (2006.01) | |
| *G02B 6/12* | (2006.01) | |
| *G02B 6/30* | (2006.01) | |
| *G02B 6/34* | (2006.01) | |

(52) U.S. Cl.
CPC ....... *G02B 6/4215* (2013.01); *H04B 10/2504* (2013.01); *H04B 10/40* (2013.01); *H04B 10/503* (2013.01); *H04B 10/516* (2013.01); *G02B 6/30* (2013.01); *G02B 6/34* (2013.01); *G02B 6/4249* (2013.01); *G02B 6/4292* (2013.01)

(58) Field of Classification Search
USPC .............. 398/68, 67, 79, 135, 138, 139, 183
See application file for complete search history.

(56) References Cited

U.S. PATENT DOCUMENTS

| | | | | |
|---|---|---|---|---|
| 6,888,664 | B2* | 5/2005 | Lee | G02F 2/004 359/326 |
| 6,895,185 | B1* | 5/2005 | Chung | H04B 10/272 398/115 |
| 7,162,164 | B2* | 1/2007 | Brown | H04B 10/505 398/183 |
| 9,066,166 | B2* | 6/2015 | Sindhu | H04Q 11/0071 |
| 9,258,076 | B2* | 2/2016 | Sindhu | H04Q 11/0071 |
| 10,120,126 | B2* | 11/2018 | Welch | G02B 6/12004 |
| 2011/0273765 | A1* | 11/2011 | Tanaka | B82Y 20/00 359/344 |
| 2012/0301149 | A1* | 11/2012 | Pinguet | H01L 21/84 398/115 |
| 2014/0029943 | A1* | 1/2014 | Mathai | H04J 14/0265 398/49 |
| 2015/0208146 | A1* | 7/2015 | Younce | H04Q 11/0066 398/21 |
| 2016/0149662 | A1* | 5/2016 | Soldano | G02B 6/30 398/51 |

* cited by examiner

METHOD AND SYSTEM FOR CASSETTE BASED WAVELENGTH DIVISION MULTIPLEXING

CROSS-REFERENCE TO RELATED APPLICATIONS/INCORPORATION BY REFERENCE

This application is a Continuation-In-Part of U.S. application Ser. No. 15/356,514 filed on Nov. 18, 2016, which claims priority to and the benefit of U.S. Provisional Application 62/386,158 filed on Nov. 18, 2015, which is hereby incorporated herein by reference in its entirety.

FIELD

Certain embodiments of the disclosure relate to semiconductor photonics. More specifically, certain embodiments of the disclosure relate to a method and system for cassette based wavelength division multiplexing.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for cassette based wavelength division multiplexing, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for cassette based wavelength division multiplexing. Exemplary aspects of the disclosure may comprise an optical system with an aggregating cassette. The optical system may comprise a plurality of optical transceivers, with each transceiver generating optical signals at a different wavelength. The aggregating cassette may comprise one or more multiplexers coupled to each of the plurality of optical transceivers via optical fibers. Each of the plurality of optical transceivers may generate a plurality of modulated optical signals at one of the different wavelengths. The optical fibers may be used to communicate one of the plurality of modulated optical signals from each of the plurality of optical transceivers to the one or more multiplexers. The one or more multiplexers may multiplex the plurality of modulated optical signals to one or more output optical fibers. The multiplexed signals may be communicated to one or more receiving demultiplexers using the one or more output optical fibers. The one or more demultiplexers may demultiplex said multiplexed signals into separate wavelength signals. The separate wavelength signals may be communicated to a corresponding receive optical system comprising one or more receive optical transceivers. Each of the plurality of optical transceivers may comprise a laser source coupled to a silicon photonics die. Each of the plurality of optical transceivers may comprise two laser sources coupled to a silicon photonics die. Optical signals received from the output optical fibers may be demultiplexed. The different wavelengths may be centered around 1300 nm, for example. The plurality of optical transceivers may be integrated on a plurality of silicon photonics die, and each of the optical transceivers may be integrated on a separate silicon photonics die.

Figure 1A:
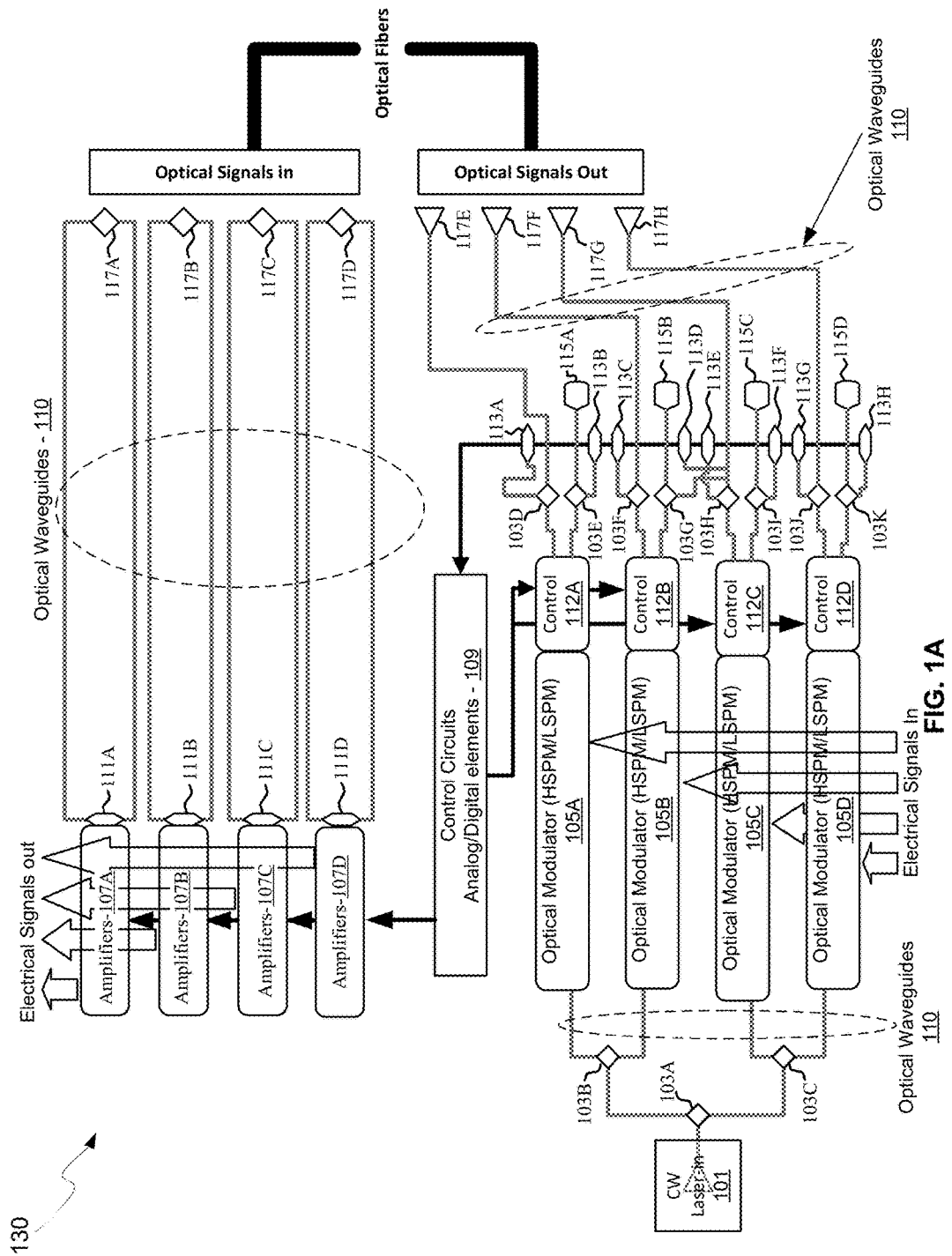
FIG. 1A is a block diagram of a photonically-enabled integrated circuit that may be used with cassette based wavelength division multiplexing, in accordance with an example embodiment of the disclosure.

FIG. 1A is a block diagram of a photonically-enabled integrated circuit that may be used cassette based wavelength division multiplexing, in accordance with an example embodiment of the disclosure. Referring to FIG. 1A, there are shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more CW optical signals to the coupler 103A.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, for example transverse-electric (TE) and transverse-magnetic (TM), or for waveguides that are truly single mode and only support one mode whose polarization is, for example, TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
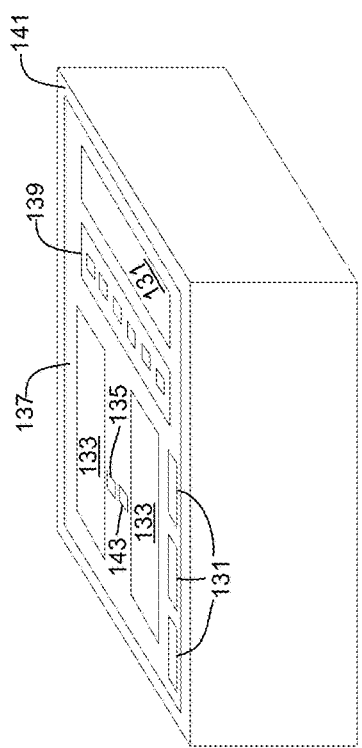
FIG. 1B is a diagram illustrating an exemplary photonically-enabled integrated circuit, in accordance with an exemplary embodiment of the disclosure.
Figure 1B:
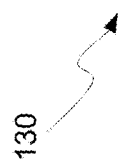

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another exemplary embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer. In an example scenario, each of the photodiodes 111A-111D may comprise a pair of photodiodes with splitters at the inputs so that each receives the optical signals from the optical waveguides 110 from a single PSGC 117A-117D.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. The amplifiers 107A-107D may comprise parallel receiver paths with separate photodiodes and TIAs, each path tuned to a different frequency range such that one may receive and amplify low frequencies and the other for high frequencies, with the electrical outputs combined to result in a desired wide frequency response. Conventional optoelectronic receivers are configured for low and high frequency ranges. Optimizing each path of the receiver around a specific portion of the frequency spectrum may result in improved receiver sensitivity and improved frequency response (even down to DC). Such a structure may be used as an optical continuous time linear equalizer or an optical frequency discriminator, for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, with parallel high and low frequency paths that are summed electrically, and subsequently communicated to other electronic circuitry, not shown, in the photonically-enabled integrated circuit 130.

FIG. 1B is a diagram illustrating an exemplary photonically-enabled integrated circuit, in accordance with an exemplary embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107 and the analog and digital control circuits 109 described with respect to FIG. 1A, for example. The optical and optoelectronic devices 133 comprise devices such as the couplers 103A-103K, optical couplers 104, optical terminations 115A-115D, grating couplers 117A-117H, optical modulators 105A-105D, high-speed heterojunction photodiodes 111A-111D, and monitor photodiodes 113A-113I.

In an example scenario, the optical and electronic devices comprise distributed receivers with parallel paths tuned to different frequency ranges and comprising separate photodiodes coupled to splitters to provide optical signals to each photodiode.

Figure 1C:
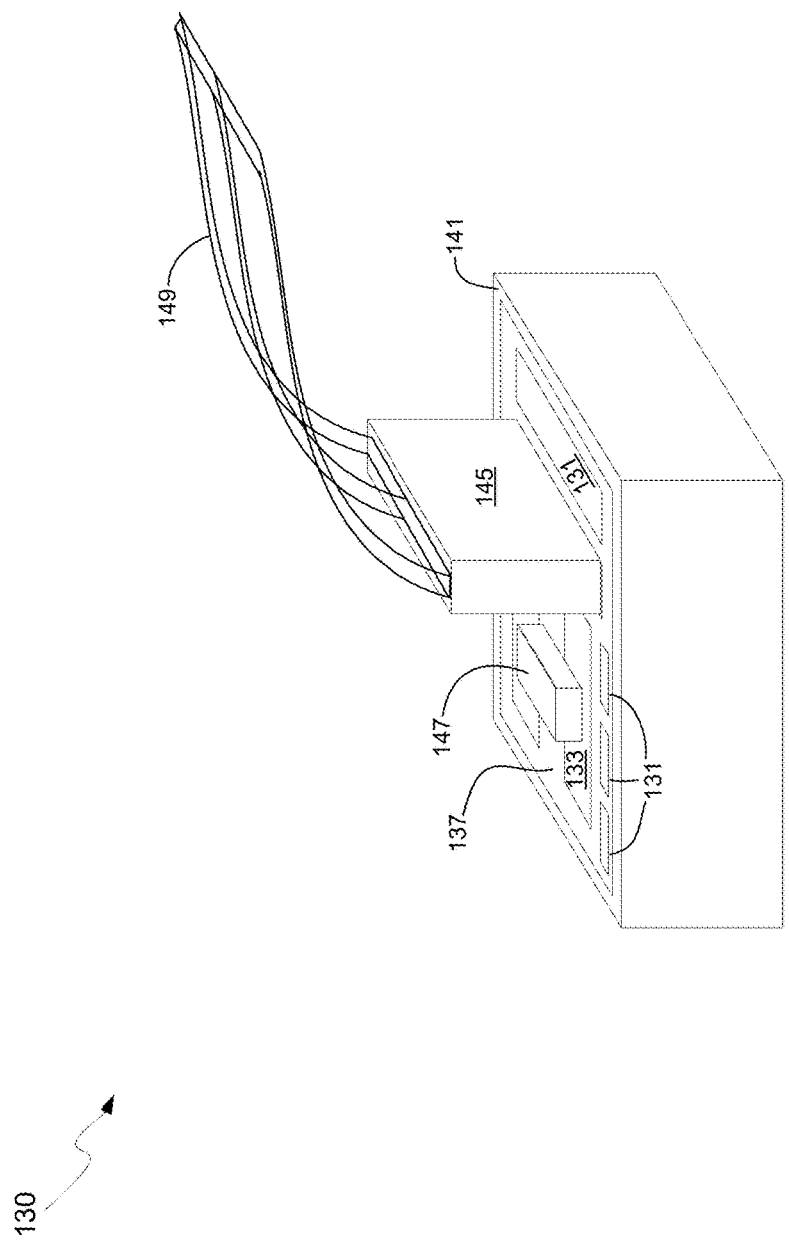
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprising the electronic devices/circuits 131, the optical and optoelectronic devices 133, the light source interface 135, the chip surface 137, and the CMOS guard ring 141 may be as described with respect to FIG. 1B, for example.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2A:
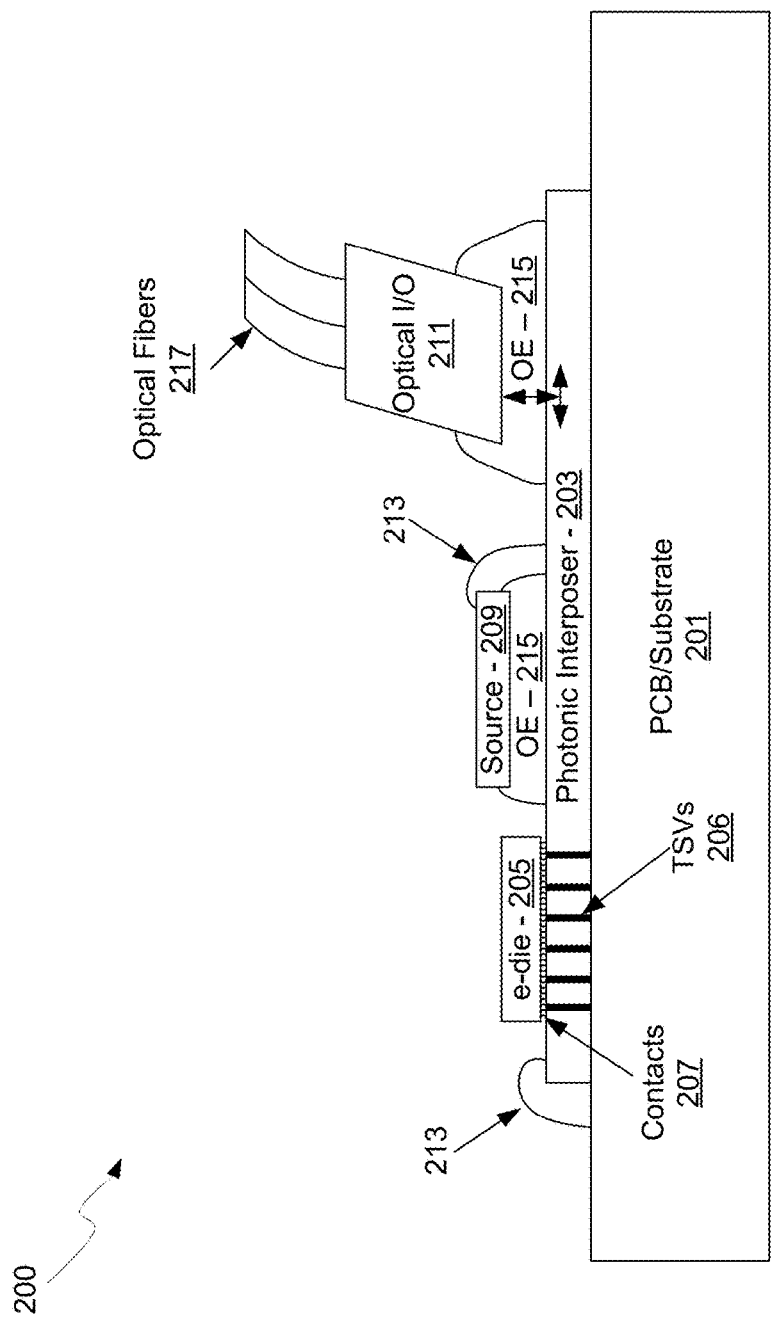
FIG. 2A is a schematic illustrating an example optical transceiver including a photonic interposer, in accordance with an embodiment of the disclosure.

FIG. 2A is a schematic illustrating an example optical transceiver including a photonic interposer, in accordance with an embodiment of the disclosure. Referring to FIG. 2A, there is shown a photonic transceiver 200 comprising a printed circuit board (PCB)/substrate 201, a silicon photonic interposer 203, an electronic CMOS die 205, through silicon vias (TSVs) 206, contacts 207, an optical source module 209, an optical input/output (I/O) 211, wire bonds 213, optical epoxy 215, and optical fibers 217.

The PCB/substrate 201 may comprise a support structure for the photonic transceiver 200, and may comprise both insulating and conductive material for isolating devices as well as providing electrical contact for active devices on the silicon photonic interposer 203 as well as to devices on the electronics die 205 via the silicon photonic interposer 203. In addition, the PCB/substrate may provide a thermally conductive path to carry away heat generated by devices and circuits in the electronics die 205 and the optical source module 209.

The silicon photonic interposer 203 may comprise a CMOS chip with active and passive optical devices such as waveguides, modulators, photodetectors, grating couplers, taps, and combiners, for example. The functionalities supported by the silicon photonic interposer 203 may comprise photo-detection, optical modulation, optical routing, and optical interfaces for high-speed I/O and optical power delivery.

The silicon photonic interposer 203 may also comprise contacts 207 for coupling the electronics die 205 to the silicon photonic interposer 203, as well as grating couplers for coupling light into the die from the optical source module 209 and into/out of the die via the optical I/O 211. The contacts 207 may comprise microbumps or copper pillars, for example. In addition, the silicon photonic interposer 203 may comprise TSVs 206 for electrical interconnection through the die, such as between the PCB/substrate 201 and the electronics die 205. Optical interfaces may also be facilitated by the optical epoxy 215, providing both optical transparency and mechanical fixation.

The electronics die 205 may comprise one or more electronic CMOS chips that provide the required electronic functions of the photonic transceiver 200. The electronics die 205 may comprise a single chip or a plurality of die coupled to the silicon photonic interposer 203 via the contacts 207. The electronics die 205 may comprise TIA's, LNAs, and control circuits for processing optical signals in the photonics chip 203. For example, the electronics die 205 may comprise driver circuitry for controlling optical modulators in the silicon photonic interposer 203 and variable gain amplifiers for amplifying electrical signals received from photodetectors in the silicon photonic interposer 203. By incorporating photonics devices in the silicon photonic interposer 203 and electronic devices in the electronics die 205, the CMOS processes for each chip may be optimized for the type of devices incorporated.

The TSVs 206 may comprise electrically conductive paths that extend vertically through the silicon photonic interposer 203 and provide electrical connectivity between the electronics die 205 and the PCB/substrate 201. This may be utilized in place of wire bonds, such as the wire bonds 213, or in conjunction with wire bonds.

The contacts 207 may comprise linear or 2D arrays of microbumps or metal pillars to provide electrical contact between the silicon photonic interposer 203 and the electronics die 205. For example, the contacts 207 may provide electrical contact between photodetectors in the silicon photonic interposer 203 and associated receiver circuitry in the electronics die 205. In addition, the contacts 207 may provide mechanical coupling of the electronics and photonics die, and may be encapsulated with underfill to protect the metal and other surfaces.

The optical source module 209 may comprise an assembly with an optical source, such as a semiconductor laser, and associated optical and electrical elements to direct one or more optical signals into the silicon photonic interposer 203. An example of the optical source module is described in U.S. patent application Ser. No. 12/500,465 filed on Jul. 9, 2009, which is hereby incorporated herein by reference in its entirety. In another exemplary scenario, the optical signal or signals from the optical source assembly 209 may be coupled into the silicon photonic interposer 203 via optical fibers affixed above grating couplers in the silicon photonic interposer 203.

The optical I/O 211 may comprise an assembly for coupling the optical fibers 217 to the silicon photonic interposer 203. Accordingly, the optical I/O 211 may comprise mechanical support for one or more optical fibers and an optical surface to be coupled to the silicon photonic interposer 203, such as by the optical epoxy 215.

In operation, continuous-wave (CW) optical signals may be communicated into the silicon photonic interposer 203 from the optical source module 209 via one or more grating couplers in the silicon photonic interposer 203. Photonic devices in the silicon photonic interposer 203 may then process the received optical signal. For example, one or more optical modulators may modulate the CW signal based on electrical signals received from the electronics die 205. Electrical signals may be received from the electronics die 205 via the contacts 207. In an example scenario, the contacts 207 may comprise copper pillars, for example, providing low-resistance contacts for high speed performance. By integrating modulators in the silicon photonic interposer 203 directly beneath the source of the electrical signals in the electronics die 205, signal path lengths may be minimized, resulting in very high speed performance. For example, utilizing ~20 micron Cu pillars with <20 fF capacitance, speeds of 50 GHz and higher can be achieved.

The modulated optical signals may then be communicated out of the silicon photonic interposer 203 via grating couplers situated beneath the optical I/O 211. In this manner, high-speed electrical signals generated in the electronics die 205 may be utilized to modulate a CW optical signal and subsequently communicated out of the silicon photonic interposer 203 via the optical fibers 217.

One or more off-chip multiplexers, not shown, may receive the modulated optical signals from each of the plurality of transmitters, for example four transmitters as shown in FIG. 1A, and combine them for transmission onto a single fiber. In this manner, if each transmitter generates a 100 GB/sec signal, a 400 GB/sec signal may be communicated on a single fiber. Multiple laser sources of different wavelengths in the optical source module 209 may enable WDM transmission.

Similarly, modulated optical signals may be received in the silicon photonic interposer 203 via the optical fibers 217 and the optical I/O 211. The received optical signals may be communicated within the silicon photonic interposer 203 via optical waveguides to one or more photodetectors integrated in the silicon photonic interposer 203. The photodetectors may be integrated in the silicon photonic interposer 203 such that they lie directly beneath the associated receiver electronics circuitry in the electronics die 205 when bonded and electrically coupled by the low parasitic capacitance contacts 207.

The hybrid integration of CMOS electronics die on a silicon photonic interposer via Cu pillars enables very high speed optical transceivers utilizing CMOS processes. In addition, integrating separate photonic and electronic die enables the independent optimization of the performance of electronic and photonic functions within the respective CMOS processes. The electronic die, which is mounted by face-to-face bonding to the silicon photonic interposer, may contain electrical circuits that "drive" the photonic circuits on the interposer. Those circuits replace the electronic signaling drive circuits from conventional electrical interconnect solutions.

In addition, an optical interconnect between multiple electronic die, i.e. chip-to-chip interconnect, is enabled by the silicon photonic interposer 203, where transceiver functions are supported by the combined electronic die and interposer and the associated optical routing on the silicon photonic interposer die 203. The disclosure is not limited to the arrangement shown in FIG. 2A. Accordingly, various stacking arrangements are possible. For example, photonic interposers may be sandwiched between electronic chips and stacks of interposers/electronic chips may be configured resulting in a 3-dimensional structure.

The photonic interposer 203 comprises through-silicon vias (TSVs) 206 that enable electrical signals to be connected to the electronic die 205 that is mounted on the top of the interposer 203. The fabrication process may necessitate backgrinding the photonic interposer 203 to reduce the silicon substrate thickness and enable the TSV process. As the substrate thickness after backgrinding is on the order of only 100 μm, a molding material is dispensed on the top of the chip assembly in order to stabilize it mechanically.

Figure 2B:
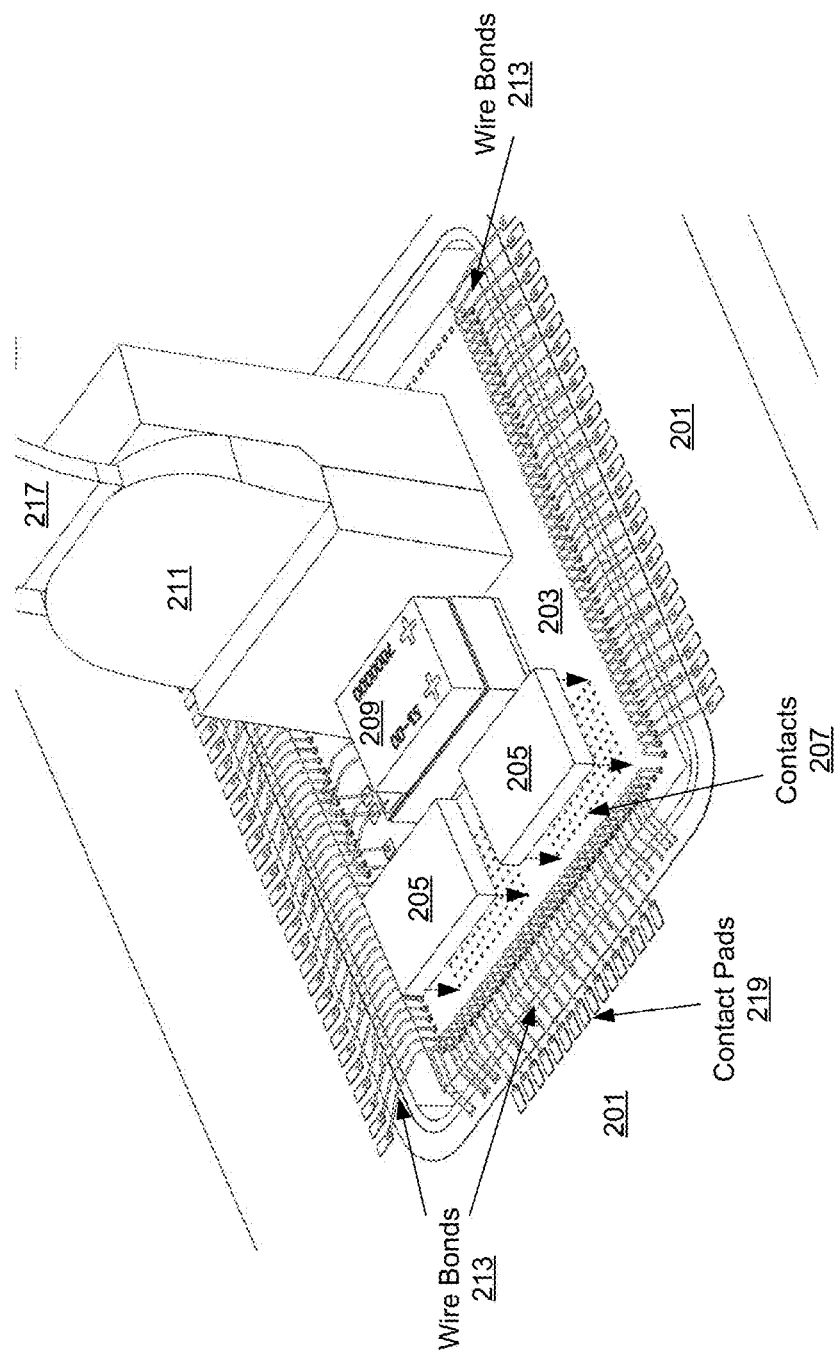
FIG. 2B is a perspective view of a photonic transceiver, in accordance with an embodiment of the disclosure.

FIG. 2B is a perspective view of a hybrid integration photonic transceiver, in accordance with an embodiment of the disclosure. Referring to FIG. 2B, there is shown the PCB/substrate 201, the silicon photonic interposer 203, electronics die 205, the contacts 207, the optical source assembly 209, the optical I/O 211, wire bonds 213, optical fibers 217, and contact pads 219.

The electronics die 205 are shown prior to bonding to the surface of the silicon photonic interposer 203 via the contacts 207, as illustrated by the dashed arrows below each die. While two electronics die 205 are shown in FIG. 2B, it should be noted that the disclosure is not so limited. Accordingly, any number of electronics die may be coupled to the silicon photonic interposer 203 depending on the number of transceivers, the particular CMOS node utilized, thermal conductance, and space limitations, for example.

In another exemplary embodiment, the optical source assembly 209 may be located remotely and one or more optical fibers may be utilized to couple the optical source signal into the silicon photonic interposer 203 via grating couplers, for example.

In an exemplary embodiment, electronic functions may be integrated into the electronics die 205 and photonics circuitry may be integrated into the silicon photonic interposer 203 utilizing independent CMOS processes, with the silicon photonic interposer 203 bonded to the substrate 201. The electronics die 205 may comprise electronic devices associated with photonic devices in the silicon photonic interposer 203, thereby minimizing electrical path lengths while still allowing independent performance optimization of electronic and photonic devices. For example, the CMOS processes that result in the highest electronics performance, such as the fastest switching speed, may not be optimum for CMOS photonics performance. Similarly, different technologies may be incorporated in the different die. For example, SiGe CMOS processes may be used for photonic devices such as photodetectors, and 32 nm CMOS processes may be used for electronic devices on the electronics die 205.

The silicon photonic interposer 203 may comprise photonic circuits, whereby optical signals may be received, processed, and transmitted out of the silicon photonic interposer 203. The optical source assembly 209 may provide a CW optical signal to the silicon photonic interposer 203, with the photonics circuitry in the silicon photonic interposer 203 processing the CW signal. For example, the CW signal may be coupled into the silicon photonic interposer 203 via grating couplers, communicated to various locations on the die via optical waveguides, modulated by Mach-Zehnder interferometer (MZI) modulators, and communicated out of the silicon photonic interposer 203 into optical fibers. In this manner, the hybrid integration of a plurality of high performance optical transceivers is enabled in CMOS processes.

In another exemplary scenario, the silicon photonic interposer 203 may provide optical routing between electronics die. For example, the electronics die 205 may comprise a plurality of processors and memory die. Electrical signals from the electronics die 205 may be communicated to modulators on the silicon photonic interposer 203 via copper pillars, for example, and converted to optical signals for routing to another electronics die via optical waveguides before being converted back to electronic signals utilizing photodetectors. In this manner, very high-speed coupling is enabled for a plurality of electronics die, reducing the memory requirements on processor chips, for example.

Figure 2C:
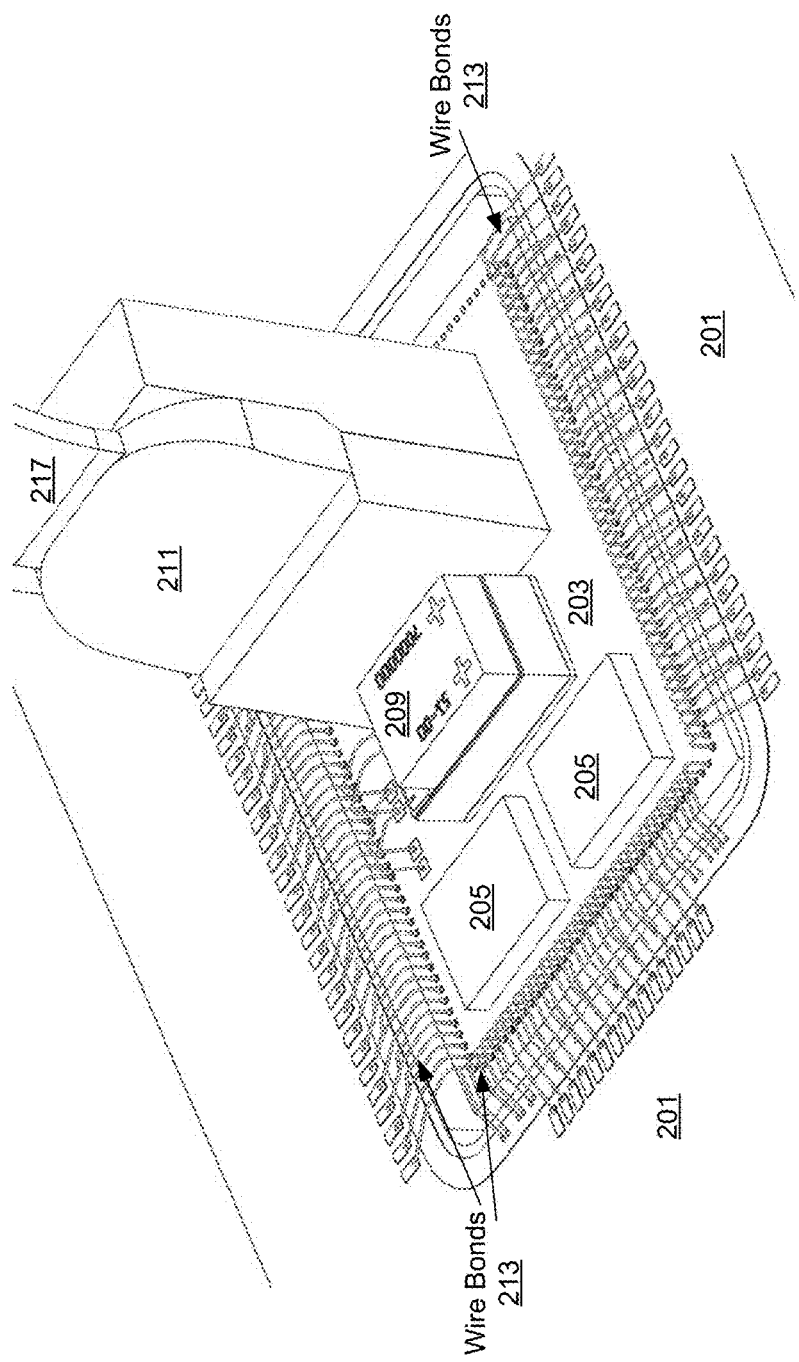
FIG. 2C is a perspective view of a photonic interposer with two coupled electronics die, in accordance with an embodiment of the disclosure

FIG. 2C is a perspective view of a photonic interposer with two coupled electronics die, in accordance with an embodiment of the disclosure. Referring to FIG. 2C, there is shown the PCB/substrate 201, the silicon photonic interposer 203, electronics die 205, the optical source assembly 209, the optical I/O 211, wire bonds 213, and optical fibers 217.

The electronics die 205 are shown bonded to the surface of the silicon photonic interposer 203 via Cu pillars, for example. While two electronics die 205 are shown in FIG. 2C, it should again be noted that the disclosure is not necessarily so limited. Accordingly, any number of electronics die may be coupled to the silicon photonic interposer 203 depending on number of transceivers, the particular CMOS node utilized, thermal conductance, and space limitations, for example.

In an exemplary embodiment, electronic functions may be integrated into the electronics die 205 and photonics circuitry may be integrated into the silicon photonic interposer 203 utilizing independent CMOS processes. The electronics die 205 may comprise electronic devices associated with photonic devices in the silicon photonic interposer 203, thereby minimizing electrical path lengths while still allowing independent performance optimization of electronic and photonic devices. Different technologies may be incorporated in the different die. For example, SiGe CMOS processes may be used for photonic devices in the silicon photonic interposer 203, such as photodetectors and modulators, and 32 nm CMOS processes may be used for electronic devices on the electronics die 205.

In another exemplary scenario, one of the electronics die 205 may comprise a conventional application specific integrated circuit (ASIC) and a second electronics die 205 may comprise a driver die with circuitry for driving the photonics devices in the silicon photonic interposer 203. Accordingly, the driver die may receive electronic signals from the ASIC via the silicon photonic interposer 203 and use the received signals to subsequently drive photonic devices in the silicon photonic interposer 203. In this manner, the second die provides the driver circuitry as opposed to the integrating driver circuitry in the ASIC. This may allow existing ASIC designs to be integrated with the silicon photonic interposer 203 without any modification to the ASIC I/O circuitry.

The silicon photonic interposer 203 may comprise photonic circuits, whereby optical signals may be received, processed, and transmitted out of the silicon photonic interposer 203. The optical source assembly 209 may provide a CW optical signal to the silicon photonic interposer 203 and biased by voltages coupled to the optical source assembly 209 via wire bonds 213. Photonics circuitry in the silicon photonic interposer 203 may then process the CW signal. For example, the CW signal may be coupled into the silicon photonic interposer 203 via grating couplers, communicated to various locations on the die via optical waveguides, modulated by MZI modulators, and communicated out of the silicon photonic interposer 203 into the optical fibers 217 via the optical I/O 211.

Heat may be conducted away from the die via the PCB/substrate 201. In this manner, the silicon photonic interposer and electronics die 205 may enable a plurality of high performance optical transceivers using separately optimized CMOS processes. Similarly, the silicon photonic interposer 203 may enable high-speed interconnects between electronic circuits in the electronics die 205, such as between processor cores and memory, for example.

Figure 3:
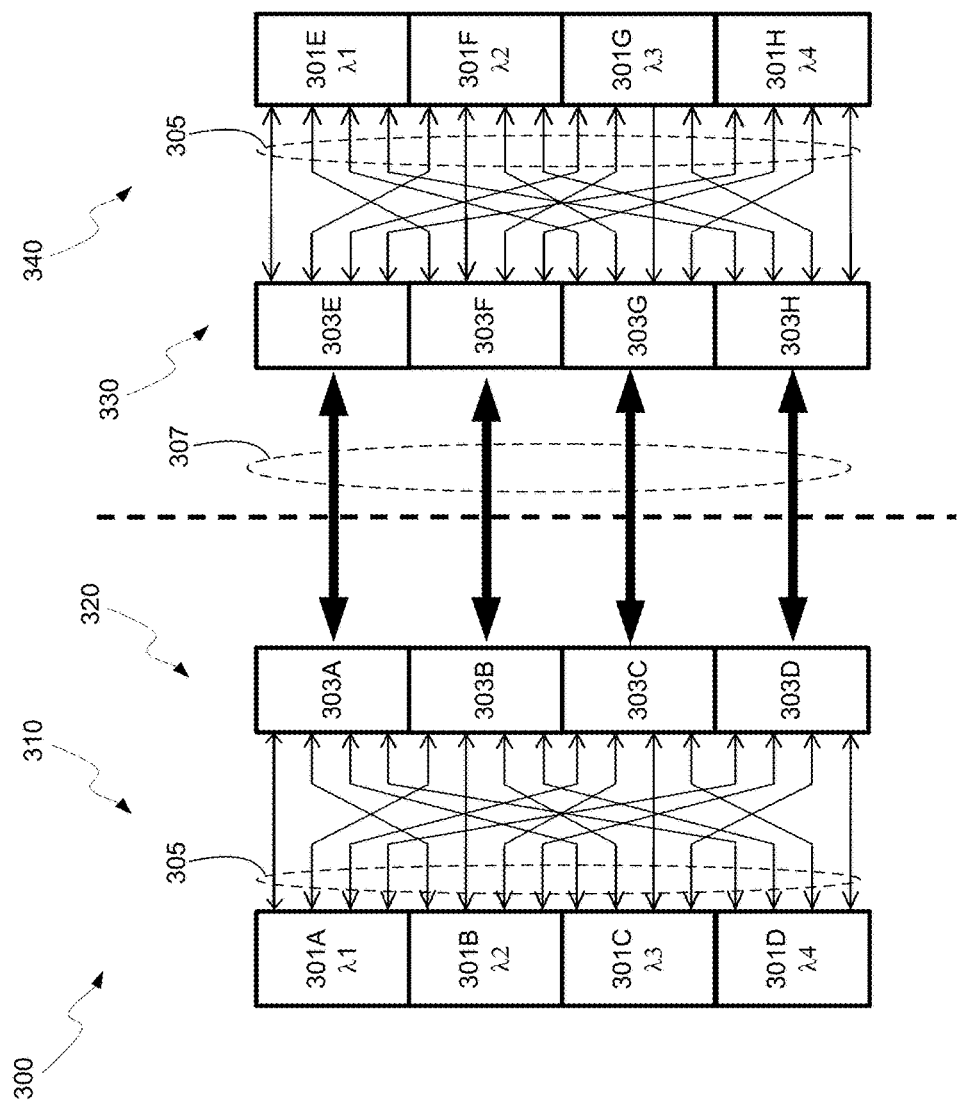
FIG. 3 illustrates optoelectronic transceivers with cassette based wavelength division multiplexing, in accordance with an example embodiment of the disclosure.

FIG. 3 illustrates optoelectronic transceivers with cassette based wavelength division multiplexing, in accordance with an example embodiment of the disclosure. Referring to FIG. 3, there is shown a cassette based WDM system 300 comprising an optical shuffle 310, aggregating cassettes 320 and 330, and an optical shuffle 340. Each optical shuffle 310 and 340 comprises an array of optical PHY units 301A-301D for shuffle 310 and optical PHY units 301E-301H for shuffle 340. There is also shown off-chip multiplexers/demultiplexers 303A-303H, optical fibers 305, and multiplexer-to-multiplexer optical fibers 307.

The optical PHY units 301A-301H may each comprise a plurality of optical transceivers transmitting and receiving at a particular wavelength for enabling cassette based WDM. For example, each optical PHY unit 301A-301D may operate at a different wavelength, as illustrated by $\lambda 1$-$\lambda 4$, as with each optical PHY unit 301E-301H. In an example scenario, the optical PHY units 301A-301D may be integrated in a silicon photonics chip with associated electronics chip while the optical PHY units 301A-301H may be integrated into another silicon photonics chip and associated electronics die, as described with respect to FIGS. 1A-2C. Furthermore, different wavelength output signals may be generated by using different wavelength laser sources mounted to the chips.

The aggregating cassettes 320 may comprise multiplexers 303A-303D and may comprise optical multiplexers that are operable to receive a plurality of optical signals from the optical PHY units 301A-301D and combine them into a single output signal to be communicated via the optical fibers 307 to the demultiplexers 303E-303H. The demultiplexers 303E-303H may be able to operate as both a multiplexer and a demultiplexer based on the direction of travel of the optical signal, which is shown by the bi-directional arrows in FIG. 3. Accordingly, the roles may be reversed for signals traveling from right to left, i.e., shuffle 340 to 310.

The multiplexers/demultiplexers 303A-303H may be off-chip from the optical PHY units 301A-301H, and may comprise an array of optical waveguides with a plurality of optical couplers that couple optical signals between adjacent waveguides such that the four input optical signals may be combined and communicated to a single output fiber 307.

A single output fiber 307 is shown for coupling between each of the optical multiplexers/demultiplexers 303A-303H, although another set of fibers may be utilized to communicate optical signals from the shuffle 340 to the shuffle 310. In an example scenario, the optical PHY units 301A-301D are also capable of receiving optical signals from the shuffle 340 and the optical PHY units 301E-310H are also operable to transmit optical signals to the shuffle 310, albeit using different optical fibers, which are not shown for clarity.

In an example scenario, each of the optical PHY units 301A-301H comprise laser sources and optical modulators for generating signals to be transmitted and also grating couplers and photodetectors for receiving optical signals.

The communicated optical signals may be at different wavelengths λ1-λ4. In an example scenario, the wavelengths λ1-λ4 may be centered around 1300 nm, typically used for optical communications, at 1270 nm, 1290 nm, 1310 nm, and 1330 nm, although other wavelengths are possible.

Long reach optical interconnects typically utilize WDM/duplex solutions, but WDM approaches limit the net throughput per laser. Furthermore, one laser per lane is needed within the optical modules. The distance from a WDM module to a first patch panel, or aggregating cassette, is typically short. Long duplex reaches typically exist between patch panels and duplex links are typically aggregated across ribbon fiber in DC environments. In an example embodiment, higher throughput per laser "colored" transceivers may be multiplexed at a patch panel where an implementation may comprise a dense WDM grid that enables parts to meet "PSM4" specs natively regardless of color. This is illustrated by the multiple wavelengths of the optical PHY units.

In the example shown in FIG. 3, the density per fiber may be higher than server-to-patch-panel fibers, where the optical fibers 307 comprise colored PSM4 interfaces, which may have tight wavelength separation to enable PSM4 interoperability. The shuffling/multiplexing of colored modules may be configured outside the shuffle, where the aggregating cassette may be part of the patch panel and comprise a top of rack media converter, for example. In an example scenario, the optical fibers 307 may communicate 400 GB/sec signals, with four 100 GB/sec signals selected from each optical PHY unit 301A-301D utilizing the multiplexers 303A-303D. Thus, with each fiber 307, which may be within a single cable, communicating 400 BG/sec, the total throughput may be 1 TB/sec.

The demultiplexers 303E-303H may receive the four 400 GB/sec signals and demultiplex each signal into four signals, with one from each demultiplexer 303E-303H communicated to each optical PHY unit 301E-301H, with each one configured to receive optical signals at a certain wavelength, λ1-λ4.

Figure 4:
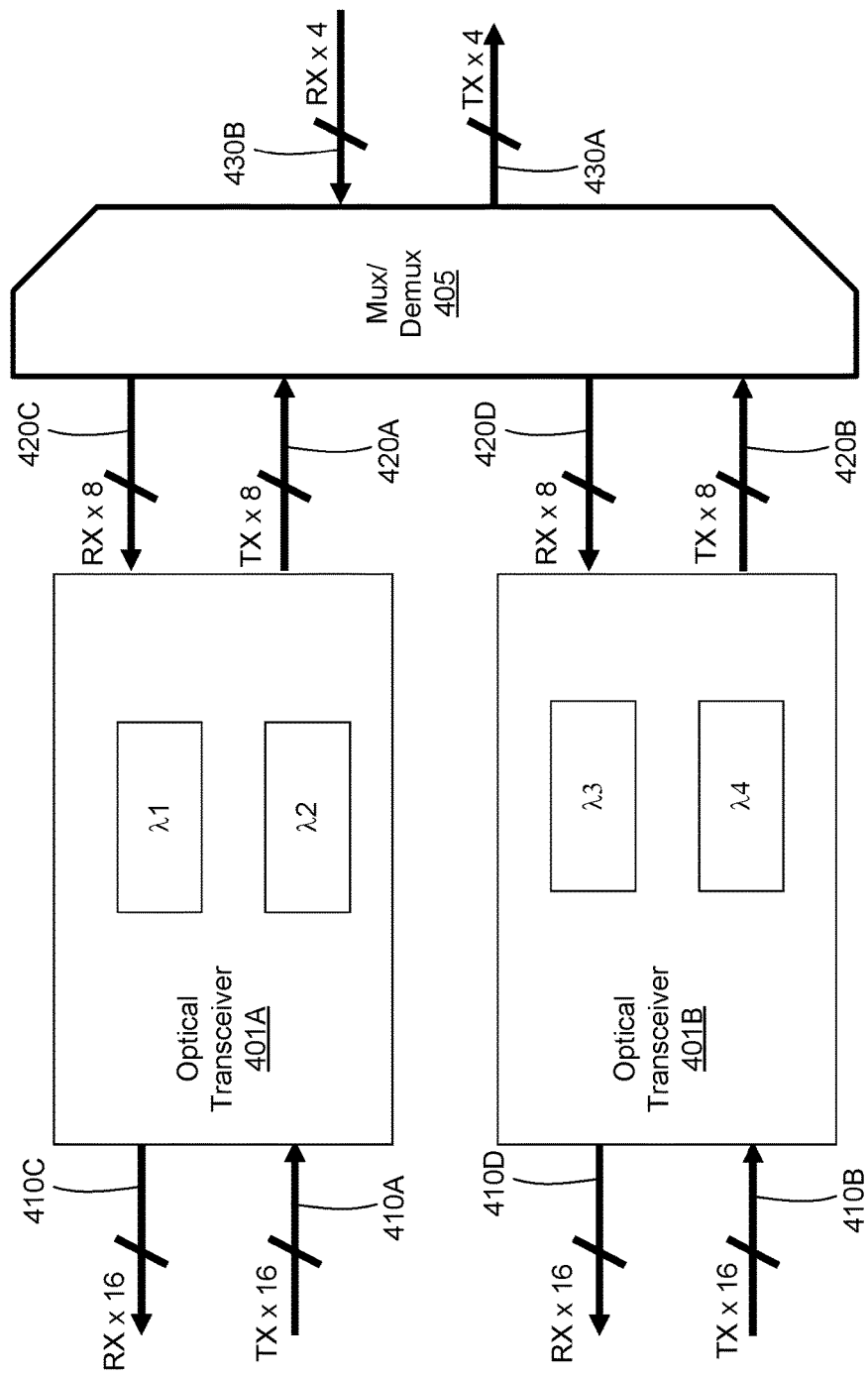
FIG. 4 illustrates an example embodiment of an optoelectronic transceiver with cassette based wavelength division multiplexing, in accordance with an example embodiment of the disclosure.

FIG. 4 illustrates an example embodiment of an optoelectronic transceiver with cassette based wavelength division multiplexing, in accordance with an example embodiment of the disclosure. Referring to FIG. 4, there are shown transceivers 401A and 401B and a multiplexer/demultiplexer 405. In the example scenario shown in FIG. 4, the optical transceiver 401A communicates using optical signals with wavelengths of λ1 and λ2 while the optical transceiver 401B communicates using optical signals with wavelengths of λ3 and λ4. Accordingly, the transceivers 401A and 401B comprise one or more silicon photonics die with one or more optical source assemblies affixed, each at a different wavelength, and one or more electronics die.

Each of the transceivers 401A and 401B may be integrated on separate die, or may be on the same die, and may be operable to receive a signal comprising multiplexed electrical signals and generate optical signals to be communicated to the multiplexer/demultiplexer 405. The multiplexer/demultiplexer 405 may be operable to receive optical signals from the transceivers 401A and 401B and multiplex them into a single optical cable comprising multiple fibers, for example. The multiplexer/demultiplexer 405 performs both multiplexing and demultiplexing based on the direction the signals are received, i.e., a multiplexer acts as a demultiplexer for signals received at its outputs. For example, the signals 430B are demultiplexed and communicated to the transceivers 401A and 401B while signals received from the transceivers 401A and 401B are multiplexed and communicated as output signals 430A. In addition, the multiplexer/demultiplexer 405 may be operable to receive multiplexed optical signals from another, or the same, optical cable and demultiplex the signals into two signals to be communicated to the optical transceivers 401A and 401B, which may be operable to convert the received optical signals into electrical signals.

In an example scenario, each of the optical transceivers 401A and 401B may receive 16 lane 50 GB/sec/lane electrical signals 410A and 410B, thus 800 GB/s input to each transceiver, and generate eight output optical signals, four at each wavelength utilized by the transceiver 401A and 401B, and communicate the output signals 420A and 420B to the multiplexer/demultiplexer 405, which multiplexes the 16 received signals to four channels 430A on four fibers each carrying 400 GB/sec for a total throughput of 1.6 TB/sec.

Likewise, the multiplexer/demultiplexer 405 may receive four 400 GB/sec signals 430B on four input optical fibers, and demultiplex the signals to 16 optical signals, 8 channels indicated by signals 420C and 420D, to each of the transceivers 401A and 401B, which may further demultiplex the signals and generate 16 electrical signals each, output signals 410C and 410D, with 50 GB/sec/lane, and thus 1.6 TB/sec throughput.

Figure 5:
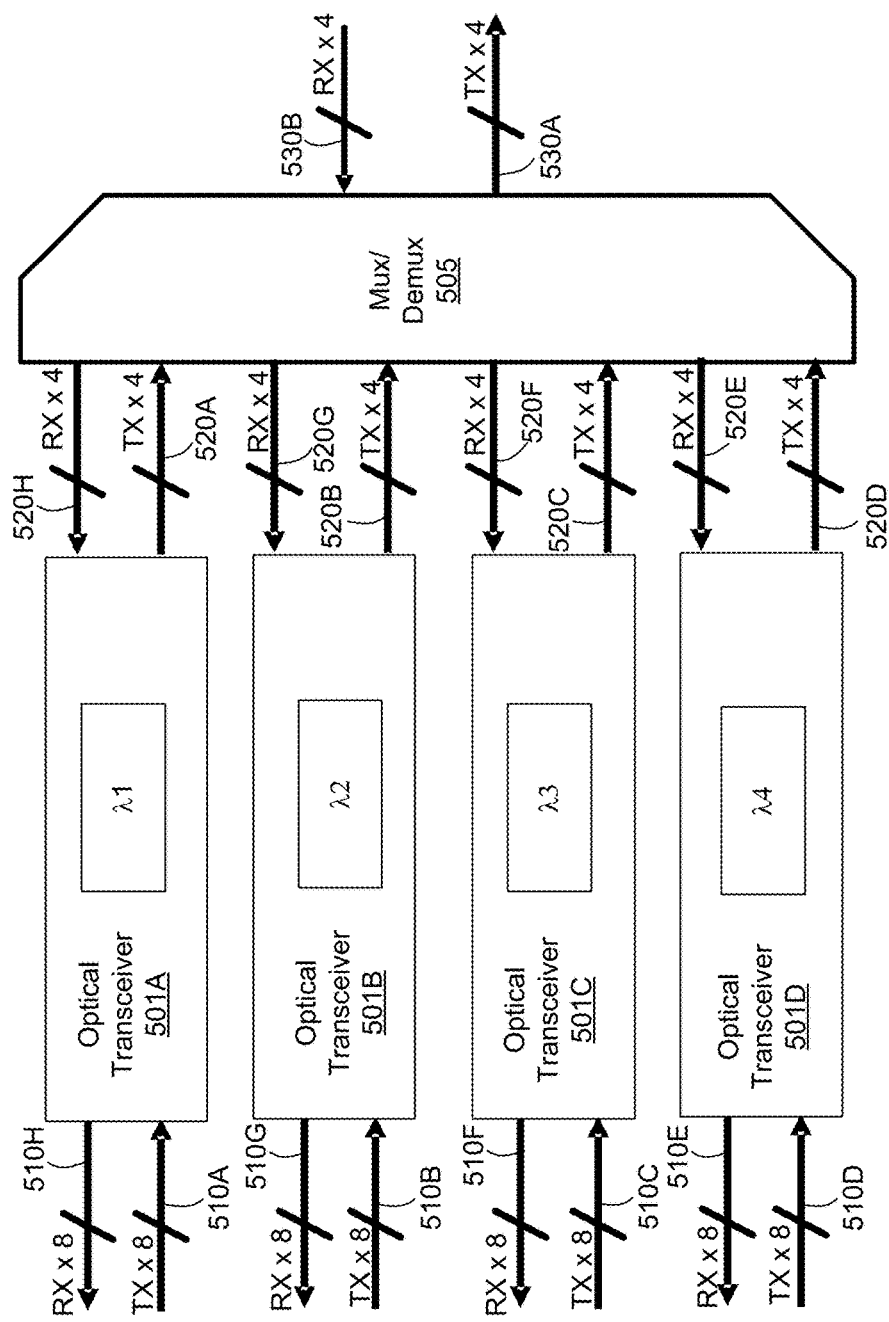
FIG. 5 illustrates another example embodiment of an optoelectronic transceiver with cassette based wavelength division multiplexing, in accordance with an example embodiment of the disclosure.

FIG. 5 illustrates another example embodiment of an optoelectronic transceiver with cassette based wavelength division multiplexing, in accordance with an example embodiment of the disclosure. Referring to FIG. 5, there are shown transceivers 501A-501D and a multiplexer/demultiplexer 505. In the example scenario shown in FIG. 5, the optical transceivers 501A-501D each communicate using optical signals with a wavelength of λ1, λ2, λ3, or λ4, respectively. Accordingly, the transceivers 501A-501D comprise one or more silicon photonics die with one or more optical source assemblies affixed, each at a different wavelength, and one or more electronics die.

Each of the transceivers 501A-501D may be integrated on separate die, or may be on the same die, and may be operable to receive a signal comprising multiplexed electrical signals and generate optical signals to be communicated to the multiplexer/demultiplexer 505. The multiplexer/demultiplexer 505 may be operable to receive optical signals from the transceivers 501A-501D and multiplex them into a single optical cable comprising four fibers, for example. In addition, the multiplexer/demultiplexer 505 may be operable to receive multiplexed optical signals from another, or the same, optical cable and demultiplex the signals into four signals to be communicated to the optical transceivers 501A-501D, which may be operable to convert the received optical signals into electrical signals.

In an example scenario, each of the optical transceivers 501A-501D may receive eight lane 50 GB/sec/lane electrical signals 510A-510D, thus 400 GB/s input to each transceiver, and generate four output optical signals, each at a wavelength utilized by the transceiver 501A-501D, and communicate the output signals 520A-520D to the multiplexer/demultiplexer 505, which multiplexes the four received signals to four channels 530A on four fibers each carrying 400 GB/sec for a total throughput of 1.6 TB/sec.

Likewise, the multiplexer/demultiplexer 505 may receive four 400 GB/sec signals 530B on four input optical fibers, and demultiplex the signals to four optical signals of different wavelength 520E-520H to each of the transceivers 501A-501D, which generate four electrical signals each, output signals 510E-510H, with eight interleaved signals of 50 GB/sec/lane, and thus 1.6 TB/sec throughput.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for optical communication, the method comprising:
   in an optical system comprising an aggregating cassette and N optical transceivers, where N is an integer greater than one, said aggregating cassette comprising N multiplexers coupled to the N optical transceivers via optical fibers:
      generating, by each of said N optical transceivers, N modulated optical signals at wavelengths different from others of said N transceivers, wherein each optical signal is generated by a single laser for each wavelength and split into said N optical signals and modulated by modulators in said N optical transceivers;
      communicating, using said optical fibers, said N modulated optical signals from each of said N optical transceivers to each of said N multiplexers; and
      multiplexing, using said N multiplexers, N modulated optical signals at N different wavelengths to each of N optical fibers.

2. The method according to claim 1, comprising communicating said multiplexed signals to one or more receiving demultiplexers using said N optical fibers.

3. The method according to claim 2, comprising demultiplexing, using said N demultiplexers, said multiplexed signals into separate wavelength signals.

4. The method according to claim 3, comprising communicating said separate wavelength signals to a corresponding receive optical system comprising one or more receive optical transceivers.

5. The method according to claim 1, wherein each of said plurality of optical transceivers comprises a laser source coupled to a silicon photonic die.

6. The method according to claim 1, wherein each of said plurality of optical transceivers comprises two laser sources coupled to a silicon photonics die.

7. The method according to claim 1, comprising demultiplexing optical signals received from said N optical fibers.

8. The method according to claim 1, wherein said different wavelengths are centered around 1300 nm.

9. The method according to claim 1, wherein said plurality of optical transceivers are integrated on a plurality of silicon photonics die.

10. The method according to claim 1, wherein said each of said optical transceivers is integrated on a separate silicon photonics die.

11. A system for optical communication, the system comprising:
    an optical system comprising an aggregating cassette and N optical transceivers, where N is an integer greater than one, said aggregating cassette comprising N multiplexers coupled to each of the N optical transceivers via optical fibers, said optical system being operable to:
       generate, by each of said N optical transceivers, N modulated optical signals at wavelengths different from others of said N transceivers, wherein each optical signal is generated by a single laser for each wavelength and split into said N optical signals and modulated by modulators in said N optical transceivers;
       communicate, using said optical fibers, said N modulated optical signals from each of said N optical transceivers to said N multiplexers; and
       multiplex, using said N multiplexers, said N modulated optical signals at N different wavelengths to each of N optical fibers.

12. The system according to claim 11, wherein said optical system is operable to communicate said multiplexed signals to one or more receiving demultiplexers using said N optical fibers.

13. The system according to claim 12, wherein said optical system is operable to demultiplex, using said N demultiplexers, said multiplexed signals into separate wavelength signals.

14. The system according to claim 13, wherein said optical system is operable to communicate said separate wavelength signals to a corresponding receive optical system comprising one or more receive optical transceivers.

15. The system according to claim 11, wherein each of said plurality of optical transceivers comprises a laser source coupled to a silicon photonic die.

16. The system according to claim 11, wherein each of said plurality of optical transceivers comprises two laser sources coupled to a silicon photonics die.

17. The system according to claim 11, wherein said optical system is operable to demultiplex optical signals received from said N optical fibers.

18. The system according to claim 11, wherein said different wavelengths are centered around 1300 nm.

19. The system according to claim 11, wherein said plurality of optical transceivers are integrated on a plurality of silicon photonics die.

20. A system for optical communication, the system comprising:

an optical system comprising an aggregating cassette and N optical transceivers, where N is an integer greater than one, said aggregating cassette comprising N multiplexers coupled to each of the N optical transceivers via N optical fibers, said optical system being operable to:

generate, by each of said N optical transceivers, N modulated optical signals at wavelengths different from others of said N transceivers wherein each optical signal is generated by a single laser for each wavelength and split into said N optical signals and modulated by modulators in said N optical transceivers;

communicate, using said optical fibers, said N modulated optical signals from each of said N optical transceivers to said N multiplexers; and multiplex, using said N multiplexers, said N modulated optical signals at N different wavelengths to each of N optical fibers.

\* \* \* \* \*